United States Patent Office 3,631,221
Patented Dec. 28, 1971

3,631,221
EPOXIDE RESIN MIXTURES
Hans Batzer, Arlesheim, Juergen Habermeier, Allschwil, and Daniel Porret, Binningen, Switzerland, assignors to Ciba Limited, Basel, Switzerland
No Drawing. Continuation-in-part of application Ser. No. 870,547, Nov. 4, 1969. This application May 14, 1970, Ser. No. 37,299
Claims priority, application Switzerland, Nov. 11, 1968, 16,803/68; Jan. 30, 1970, 1,348/70
Int. Cl. C08g *45/00, 45/06*
U.S. Cl. 260—830 TW                8 Claims

ABSTRACT OF THE DISCLOSURE

Epoxide resin mixtures, which are storage-stable and noncrystallising at room temperature, of (a) diglycidyl ethers of mononuclear, five-membered or six-membered, unsubstituted or substituted, oxyalkylated N-heterocyclic compounds which contain two NH groups in the molecule (for example 1,3-(2'-glycidyloxy-n-propyl)-5,5-dimethyl-hydantoin) and (b) polyglycidyl compounds of the N-heterocyclic series, which contain at least one heterocyclic ring which possesses the grouping

—NH—CO— at least once, and wherein at least two glycidyl groups or β-methylglycidyl groups in the polyglycidyl compounds are directly linked to endocyclic nitrogen atoms (for example 1,3-diglycidyl-5,5-dimethylhydantoin). These epoxide resin mixtures have not been specifically described in the main patent.

CROSS REFERENCE TO RELATED APPLICATION

This is a continuation-in-part of our copending application Ser. No. 870,547 filed Nov. 4, 1969.

BACKGROUND OF THE INVENTION

The subject are new diglycidyl compounds of general formula:

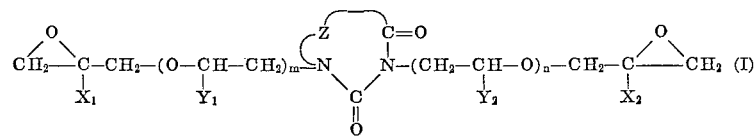
(I)

wherein $X_1$, $X_2$, $Y_1$ and $Y_2$ each denote a hydrogen atom or a methyl group and Z denotes a nitrogen-free divalent radical which is required for completing a five-membered or six-membered, unsubstituted or substituted, heterocyclic ring, and $m$ and $n$ each represent an integer having a value of 0 to 30, preferably of 0 to 4, with the sum of $m$ and $n$ having to be at least 1.

The compounds of Formula I are manufactured by reacting compounds of general formula

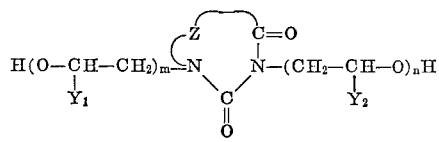
(Ia)

wherein $Y_1$, $Y_2$, Z, $m$ and $n$ have the same significance as in Formula I, in a single step or in several steps, with an epihalogenohydrin or β-methylepihalogenohydrin, such as for example epichlorohydrin, β-methylepichlorhydrin or epibromhydrin, in a manner which is in itself known.

The compounds of Formula I can be cured by means of the customary curing agents for polyepoxide compounds to give moulded materials.

It has now been found that moulded materials with particularly advantageous properties are obtained if mixtures of epoxide compounds of Formula I, in which the glycidyl groups are bonded to the N-heterocyclic ring via a mobile chain, and polyglycidyl compounds of the N-heterocyclic series, which contain at least one heterocyclic ring which possesses the grouping

at least once, and wherein at least two glycidyl groups or β-methylglycidyl groups in the polyglycidyl compounds are directly linked to endocyclic nitrogen atoms, that is to say the glycidyl groups are directly bonded to the rigid N-heterocyclic ring, are cured with a curing agent for epoxide resins, especially with a polycarboxylic acid anhydride.

The mixtures of the abovementioned epoxide compounds are preferably liquids and are thus easily processable. If easily crystallising polyglycidyl compounds of the N-heterocyclic series are used, crystallising out from the mixture can be avoided by the addition of a little dicarboxylic acid anhydride, which effects a partial pre-addition of the glycidyl compounds. It is however also possible to use solvents containing epoxide groups, such as N-glycidyloxazolidin-2-ones, for preventing the N-glycidyl compounds crystallising out of the mixtures mentioned. The mixtures manufactured in this way are storage-stable and non-crystallising liquid epoxide resins. On the other hand it is however also possible to mix the appropriate abovementioned epoxide resins only directly before the addition of the curing agent.

The subject of the present invention is therefore curable mixtures which are suitable for the manufacture of shaped articles, including sheet-like structures, characterised in that they contain (a) diglycidyl ethers of general formula

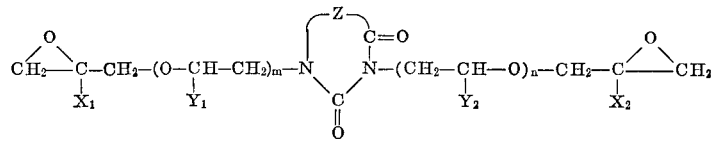

wherein $X_1$, $X_2$, $Y_1$ and $Y_2$ each denote a hydrogen atom or a methyl group and Z denotes a nitrogen-free divalent radical which is necessary for completing a five-membered or six-membered, unsubstituted or substituted, heterocyclic ring, and $m$ and $n$ each represent an integer having a value of 0 to 30, preferably of 0 to 4, with the sum of $m$ and $n$ having to be at least 1, (b) polyglycidyl compounds of the N-heterocyclic series which contain at least one heterocyclic ring which possesses the grouping

at least once, and wherein at least two glycidyl groups or β-methylglycidyl groups in the polyglycidyl compounds are directly linked to endocyclic nitrogen atoms, and (c) a curing agent for epoxide resins, especially a polycarboxylic acid anhydride, as well as, optionally, a curing catalyst.

Polyglycidyl compounds of the N-heterocyclic series (b) are conveniently accessible according to known methods by reaction of epichlorhydrin or β-methylepichlorhydrin with heterocyclic urea derivatives such as especially cyanuric acid, ethyleneurea, hydantoin, substituted hydantoins, bis(hydantoin) compounds, uracil, substituted uracils, dihydrouracils or bis(dihydrouracil) compounds in the presence of suitable catalysts, for example tertiary amines.

The following may be mentioned: the triglycidyl isocyanurate of formula

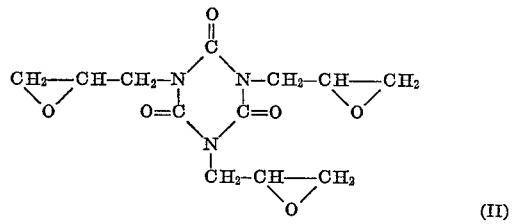

(II)

N,N'-diglycidyl-parabanic acid; N,N'-diglycidyl compounds of formula

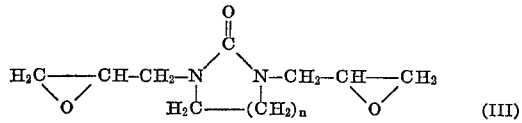

(III)

wherein $n=1$ or 2, that is to say N,N'-diglycidylpropyleneurea and above all N,N'-diglycidylethyleneurea (=1,3-diglycidyl-imidazoline-2); N,N'-diglycidyl compounds of the formula

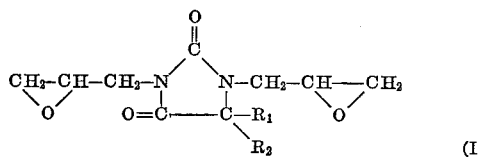

(IV)

wherein $R_1$ and $R_2$ each denote a hydrogen atom or a lower alkyl radical with 1 to 4 carbon atoms or wherein $R_1$ and $R_2$ together form a tetramethylene or pentamethylene radical; representatives of this class of compound are, for example: 1,3-diglycidyl-hydantoin, 1,3-diglycidyl-5-methyl - hydantoin, 1,3-diglycidyl-5-n-propyl-hydantoin, 1,3-diglycidyl-5-methyl-5-ethyl-hydantoin, 1,3-diglycidyl-1,3-diaza-spiro(4,5)-decane-2,4-dione, 1,3-diglycidyl-1,3-diazaspiro(4,4)-nonane-2,4-dione and especially 1,3-diglycidyl-5,5-dimethyl-hydantoin as well as 1,3-diglycidyl-5-isopropyl-hydantoin.

N,N'-diglycidyl compounds of formula

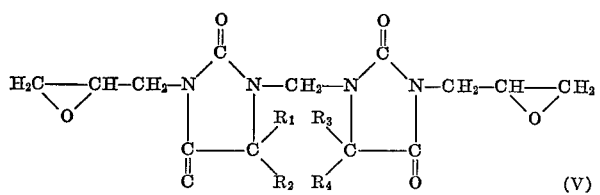

(V)

wherein $R_1$, $R_2$, $R_3$ and $R_4$ each denote a hydrogen atom or a lower alkyl radical with 1 to 4 carbon atoms, or wherein $R_1$ and $R_2$ and/or $R_3$ and $R_4$ together form a tetramethylene or pentamethylene radical; representatives of this class of compound are, for example, bis-(3-glycidyl-5,5-dimethyl-hydantoinyl - 1) - methane, bis-(3-glycidyl-5-methyl-5-ethyl-hydantoinyl - 1)-methane and bis-(3-glycidyl-5-propyl-hydantoinyl-1)-methane.

N,N'-diglycidyl compounds of formula

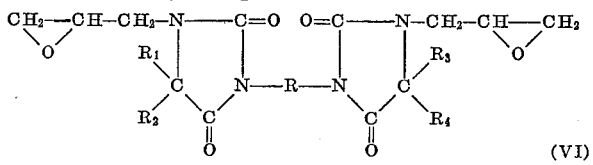

(VI)

wherein R is an aliphatic, cycloaliphatic or araliphatic radical and $R_1$, $R_2$, $R_3$ and $R_4$ each denote a hydrogen atom or a lower alkyl radical with 1 to 4 carbon atoms, or wherein $R_1$ and $R_2$ and/or $R_3$ and $R_4$ together form a tetramethylene or pentamethylene radical; representatives of this class of compound are, for example, bis(1-glycidyl-5,5-dimethyl-hydantoinyl-3)methane, 1,2-bis(1'-glycidyl-5',5'-dimethyl-hydantoinyl-3')ethane, 1,4-bis(1'-glycidyl-5',5'-dimethyl-hydantoinyl-3')butane, 1,6-bis(1'-glycidyl-5',5'-dimethyl-hydantoniyl - 3')hexane, 1,2-bis(1'-glycidyl-5,5-dimethyl-hydantoinyl - 3')dodecane, β,β'-bis (1'-glycidyl-5',5'-dimethyl-hydantoinyl-3')diethyl-ether.

N,N'-diglycidyl compounds of formula

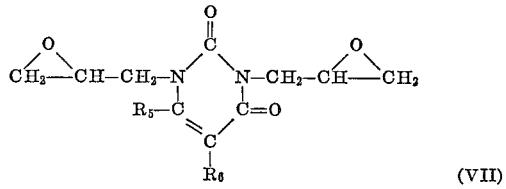

(VII)

wherein $R_5$ and $R_6$ independently of one another each denote a hydrogen atom or a lower alkyl radical with 1 to 4 carbon atoms; representatives of this class of compound are, for example, 1,3-diglycidyl-uracil, 1,3-diglycidyl-6-methyl-uracil and 1,3-diglycidyl-5-methyl-uracil.

N,N'-diglycidyl compounds of formula

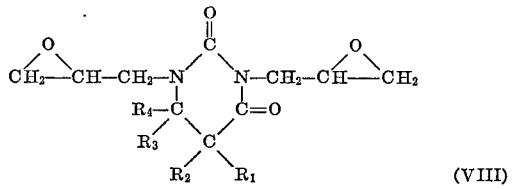

(VIII)

wherein $R_1$ and $R_2$ denote identical or different alkyl radicals, preferably methyl groups, and $R_3$ and $R_4$ independently of one another each denote a hydrogen atom or an alkyl radical ($R_3$ is preferably an alkyl radical with 1 to 4 carbon atoms and $R_4$ is preferably hydrogen).

Representatives of this class of compound are, for example, 1,3-diglycidyl-5,5-dimethyl-5,6-dihydro-uracil and 1,3 - diglycidyl - 5,5 - dimethyl - 6 - isopropyl-5,6-dihydro-uracil.

N,N'-diglycidyl compounds of formula

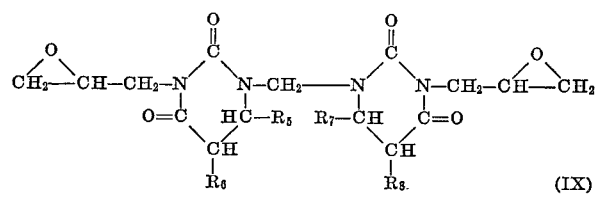

(IX)

wherein $R_5$, $R_6$, $R_7$ and $R_8$ independently of one another each denote a hydrogen atom or a lower alkyl radical with 1 to 4 carbon atoms; representatives of this class of compound are, for example, 3,3'-diglycidyl-1,1'-methylene-bis(5,6-dihydro-uracil), 3,3'-diglycidyl-1,1'-methylene-bis-(6 - methyl-5,6-dihydro-uracil), 3,3'-diglycidyl-1,1'-methylene-bis-(5,5-dimethyl-5,6-dihydro-uracil).

The mixing ratios of the two abovementioned epoxide components (a) and (b) depend on the particular end use. For many cases, mixtures of 1 mol of the epoxide compound (a) and 1 mol of the epoxide compound (b) prove to be most suitable, since the shaped articles obtained therefrom by curing show, alongside good mechanical strengths, a certain flexibility, whilst retaining good resistance to heat distortion.

However, optimum properties can also be achieved with other mixing ratios, depending on the nature of the combined resins.

The mixtures of the abovementioned epoxide compounds (a) and (b) are preferably cured with polycarboxylic acid anhydrides. However, it is also possible to cure with polyamines.

The curable epoxide resin mixtures can furthermore be mixed, in any phase before curing, with the customary modifiers, such as extenders, fillers and reinforcing agents, pigments, dyestuffs, organic solvents, plasticisers, flow control agents, agents for conferring thixotropy, flameproofing substances or mould release agents.

The curable epoxide resin mixtures according to the invention are above all employed in the fields of surface protection, the electrical industry, the laminating processes and the building industry.

In the examples which follow, unless otherwise stated, parts denote parts by weight and percentages denote percentages by weight; the relationship of parts by volume to parts by weight is as of the milliliter to the gram.

The 10% value of tg δ is the temperature at which the dielectric loss factor tg δ exceeds a value of $1 \times 10^{-1}$.

(a) MANUFACTURE OF THE EPOXIDE RESIN MIXTURES

Example 1

A mixture of 259 g. of industrially manufactured 1,3-di - (2' - glycidyloxy - n-propyl)-5,5-dimethylhydantoin of 5.75 epoxide equivalents/kg., 212 g. of industrially manufactured triglycidylisocyanurate of 9.2 epoxide equivalents/kg., 200 g. of N-glycidyl-oxazolidin-2-one (epoxide content 6.80 equivalents/kg.) and 58.9 g. of hexahydrophthalic anhydride is stirred for 14 hours at 100–105° C. A clear, light brown, non-crystallising resin with an epoxide content of 5.18 equivalents/kg. is obtained.

Example 2

A mixture of 1900 g. of industrially manufactured 1,3-di - (2' - glycidyloxy - n - propyl) - 5,5-dimethylhydantoin (epoxide content: 5.80 equivalents/kg.), 1375 g. of 1,3-diglycidyl-5,5-dimethylhydantoin (epoxide content: 8.0 equivalents/kg.) and 275 g. of hexahydrophthalic anhydride is stirred for 15 hours at 110° C. A clear, transparent, light brown, noncrystallising resin of 5.44 epoxide equivalents/kg. is obtained. The viscosity of this resin at 25° C. is 16,500 cp., and the density at 20° C.: 1.205 g./cm.³

Example 3

If 380 g. of 1,3 - di - (2'-glycidyloxy-n-propyl)-5,5-dimethylhydantoin (epoxide content 5.80 equivalents/kg.), 275.0 g. of 1,3-diglycidyl-5,5-dimethylhydantoin (epoxide content: 8.0 equivalents/kg.) and 27.5 g. of hexahydrophthalic anhydride are stirred for 12 hours in an open vessel at 120° C., a clear, light brown, non-crystallising resin is obtained. The epoxide content is 6.00 equivalents per kg. The density at 20° C. is 1.19 g./cm.³; the viscosity at 25° C. is 2800 cp.

Example 4

447 g. of industrially manufactured 1,3-diglycidylethyleneurea of an epoxide content of 7.2 equivalents/kg. and 554 g. of industrially manufactured 1,3-di-(2'-glycidyloxy-n-propyl)-5,5-dimethylhydantoin (epoxide content: 5.80 equivalents/kg.) are mixed at room temperature. The liquid, non-crystallising, resin has an epoxide content of 6.35 equivalents/kg.

(b) USE EXAMPLES

Example 1

100 parts of the resin mixture according to the invention described in Example 1 are mixed with 80 parts of hexahydrophthalic anhydride and 1 part of the curing accelerator, consisting of a sodium alcoholate solution, manufactured by dissolving, at elevated temperature, 0.82 part of sodium metal in 100 parts of 3-hydroxymethyl-2,4-dihydroxypentane at 80° C., and subsequently described as "sodium hexanetriolate" for brevity, and the mixture is cast into casting moulds made of aluminium and prewarmed to 80° C. The mixture is first allowed to gel at 80° C. over a total of 4 hours and is subsequently cured for 16 hours at 140° C. The resulting mouldings have the excellent mechanical properties indicated below:

Flexural strength VSM 77,103—16–20 kp./mm.²
Deflection VSM 77,103—5–10 mm.
Impact strength VSM 77,105—15–20 cm. kp./cm.²
Heat distortion point according to Martens, DIN 53,458—85–95° C.
Water absorption after 4 days, 25° C.; 60 x 10 x 4 mm. test rod—0.4–0.5% by weight.

Example 2

100 parts of the resin mixture according to the invention described in Example 2 are mixed with 80 parts of hexahydrophthalic anhydride and 6 parts of the "sodium hexanetriolate" curing accelerator and cast into casting moulds made of aluminium and prewarmed to 80° C. The mixture is first allowed to gel at 80° C. over a total of 4 hours and is subsequently cured for 16 hours at 140° C. The resulting mouldings possess the excellent mechanical and dielectric properties given below:

Flexural strength VSM 77,103—17–20 kp./mm.²
Deflection VSM 77,103—8–12 mm.
Impact strength VSM 77,105—18–23 cm. kp./cm.²
Heat distortion point according to Martens, DIN 53,458—95–105° C.
Water absorption after 4 days, 25° C.; 60 x 10 x 4 mm. test rod—0.3–0.4% by weight
Tensile strength, VSM 77,101—7–9 kp./mm.²
Elongation at break, VSM 77,101—3–5%
10% value of tg δ VDE 0303—125° C.

Example 3

100 parts of the resin mixture according to the invention described in Example 3 are mixed with 80 parts of hexahydrophthalic anhydride and 4 parts of the "sodium hexanetriolate" curing accelerator and cast into casting moulds made of aluminium and prewarmed to 80° C. The mixture is first allowed to gel at 80° C. over a total of 4 hours and is subsequently cured for 16 hours at 140° C.

The resulting mouldings possess the excellent mechanical properties given below:

Flexural strength VSM 77,103—15–20 kp./mm.²
Deflection VSM 77,103—8–12 mm.
Impact strength VSM 77,105—12–18 cm. kp./cm.²
Heat distortion point according to Martens, DIN 53,458—90–100° C.
Water absorption after 4 days, 25° C.; 60 x 10 x 4 mm. test rod—0.4–0.4% by weight.

Example 4

100 parts of the resin mixture according to the invention described in Example 4 are mixed with 95 parts of hexahydrophthalic anhydride and 1 part of the curing accelerator benzyldimethylamine at 80° C. and cast into casting moulds made of aluminium and prewarmed to 80° C. The mixture is first allowed to gel at 80° C. over a total of 4 hours and is subsequently cured for 16 hours at 140° C. The resulting mouldings possess the excellent mechanical properties given below:

Flexural strength VSM 77,103—16–20 kp./mm.²
Deflection VSM 77,103—9–13 mm.
Flexural impact strength VSM 77,105—20–25 cm. kp./cm.²

Heat distortion point according to Martens, DIN 53,458— 80–90° C.
Water absorption after 4 days, 25° C.; 60 x 10 x 4 mm. test rod—0.4–0.5% by weight.

Example 5

150 parts of 1,1′ - methylene-bis-(3 - glycidyl-5,5-dimethylhydantoin) of an epoxide content of 5.0 equivalents/kg. are mixed with 172 parts of 1,3-di-(2′-glycidyloxy-n-propyl) - 5,5 - dimethylhydantoin. A clear, practically colourless, homogeneous melt is manufactured by warming to 100° C.

This melt is mixed at 80° C. with 24.1 parts of hexahydrophthalic anhydride and 5 parts of benzyldimethylamine. The melt is cast into aluminium moulds of 4 mm. wall thickness, prewarmed to 120° C., and is cured in 2 hours at 120° C. and 15 hours at 150° C. The mouldings thus obtained show the following mechanical properties.

Flexural strength, VSM 77,103—13.6–15.5 kp./mm.$^2$
Deflection, VSM 77,103—6.4 mm.
Impact strength, VSM 77,105—11.5–14.8 cm. kp./cm.$^2$
Tensile strength, VSM 77,101—5.1–5.7 kp./mm.$^2$
Elongation at break, VSM 77,101—3.6–4.0%
Heat distortion point according to Martens, DIN 53,458— 81° C.
Water absorption after 4 days, 20° C.—0.50%
Breakdown voltage; momentary—219 kv./cm.
Tracking resistance, VDE—KA3c
Arcing resistance, DIN—L4
Dielectric constant $\epsilon$:
  At 25° C.—3.5
  At 80° C.—3.5
Dielectric loss factor tg $\delta$ (50 Hz.) at 80° C.—0.005
10% value of tg $\delta$—140° C.
Specific resistance:
  At 22° C.—5.5×10$^{17}$Ω.cm.
  At 50° C.—1×10$^{16}$Ω.cm.

What is claimed is:

1. A composition of matter which comprises a mixture of (a) a diglycidyl ether of formula

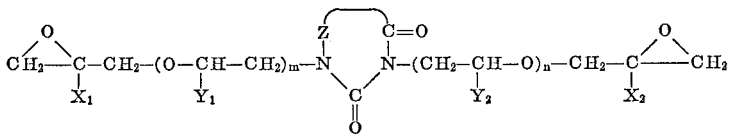

wherein $X_1$, $X_2$, $Y_1$ and $Y_2$ each represents a member selected from the group consisting of a hydrogen atom and a methyl group and Z represents a member selected from the group consisting of a divalent residue of formulae

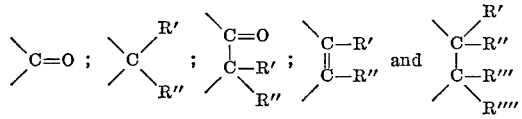

wherein R′, R″, R‴ and R⁗ each represents a member selected from the group consisting of alkyl with 1 to 5 carbon atoms, alkenyl with 1 to 5 carbon atoms, cyclohexyl, cyclohexenyl, phenyl and substituted phenyl, or when the residue Z represents the formula

R′ and R″ together can also form a member selected from the group consisting of divalent tetramethylene and pentamethylene residue, and $m$ and $n$ each represent an integer having a value of 0 to 30 with the sum of $m$ and $n$ having to be at least 1, and (b) polyglycidyl compounds of the N-heterocyclic series which contain at least one heterocyclic ring which possesses the grouping

at least once, and wherein at least two glycidyl groups or $\beta$-methylglycidyl groups in the polyglycidyl compounds are directly linked to endocyclic nitrogen atoms, and (c) a curing agent for epoxide resins as well as, optionally, a curing catalyst.

2. A composition according to claim 1, which contains 1,3 - di-(2′-glycidyloxy-n-propyl)-5,5-dimethylhydantoin as the epoxide (a).

3. A composition according to claim 1, which contains triglycidyl-isocyanurate as the epoxide (b).

4. A composition according to claim 1, which contains 1,3-diglycidyl-5,5-dimethylhydantoin as the epoxide (b).

5. A composition according to claim 1, which contains 1,3-diglycidylethyleneurea as the epoxide (b).

6. A composition according to claim 1, which contains 1,1′-methylene-bis-(3-glycidyl-5,5-dimethyl-hydantoin) as the epoxide (b).

7. A composition according to claim 1, which contains a polycarboxylic acid anhydride as the curing agent for epoxides.

8. A composition according to claim 7, which contains hexahydrophthalic anhydride as the polycarboxylic acid anhydride.

References Cited

UNITED STATES PATENTS 3,429,833   2/1969   Porret et al. _____ 260—830
3,449,353   6/1969   Porret et al. _____ 260—830
3,542,803  11/1970   Porret _____ 260—830

PAUL LIEBERMAN, Primary Examiner

U.S. Cl. X.R.

260—2 Ep, 37 Ep, 78.4 Ep, 257, 309.5